US009559510B2

(12) United States Patent
Royer et al.

(10) Patent No.: US 9,559,510 B2
(45) Date of Patent: Jan. 31, 2017

(54) SIGNALLING DEVICE FOR A TRANSMISSION LINE

(71) Applicant: Tyco Electronics Simel SAS, Gevrey-Chambertin (FR)

(72) Inventors: Laurent Royer, Courlon (FR); Vincent Chauveau, Clemency (FR)

(73) Assignee: Tyco Electronics Simel SAS, Gevrey-Chambertin (FR)

( * ) Notice: Subject to any disclaimer, the term of this patent is extended or adjusted under 35 U.S.C. 154(b) by 173 days.

(21) Appl. No.: 14/380,366

(22) PCT Filed: Feb. 21, 2013

(86) PCT No.: PCT/EP2013/053473
§ 371 (c)(1),
(2) Date: Aug. 21, 2014

(87) PCT Pub. No.: WO2013/124365
PCT Pub. Date: Aug. 29, 2013

(65) Prior Publication Data
US 2015/0303671 A1 Oct. 22, 2015

(30) Foreign Application Priority Data
Feb. 24, 2012 (FR) .................................. 12 51704

(51) Int. Cl.
*A01M 29/06* (2011.01)
*H02G 7/00* (2006.01)
*B64F 1/36* (2006.01)

(52) U.S. Cl.
CPC ................ *H02G 7/00* (2013.01); *A01M 29/06* (2013.01); *B64F 1/36* (2013.01)

(58) Field of Classification Search
CPC .............. H02G 7/00; B64F 1/36; A01M 29/06
(Continued)

(56) References Cited

U.S. PATENT DOCUMENTS 2,410,277 A * 10/1946 Farris ........................ B64F 1/20
174/112
3,135,236 A * 6/1964 Pfeiffer .................... H02G 7/00
116/209
(Continued)

FOREIGN PATENT DOCUMENTS

DE 2932108 A1 2/1981
EP 0486744 A1 5/1992
(Continued)

OTHER PUBLICATIONS

International Preliminary Report on Patentability issued by The International Bureau of WIPO, Geneva, Switzerland, dated Aug. 26, 2014, for International Application No. PCT/EP2013/053473; 5 pages.
(Continued)

*Primary Examiner* — R. A. Smith
*Assistant Examiner* — Tania Courson
(74) *Attorney, Agent, or Firm* — Faegre Baker Daniels LLP

(57) ABSTRACT

The invention relates to a signalling device (1) for an aerial transmission line (2) comprising two signalling elements (3, 4) which are configured to be mounted one against the other around a conductor portion (2) of the transmission line, in which at least one of the two signalling elements (3, 4) comprises at least partially an outer signalling coating in the context of air safety, which device is characterized in that the two signalling elements (3, 4) are at least partially electrically conductive and at least one of the two signalling elements (3, 4) comprises a clamping means (5) which is configured to clamp the conductor portion (2) of the transmission line. The invention also relates to a method for assembling such a device on a high-voltage aerial transmission line.

20 Claims, 6 Drawing Sheets

(58) Field of Classification Search
USPC .................. 116/22 A, 209, DIG. 33; 29/601
See application file for complete search history.

(56) References Cited

U.S. PATENT DOCUMENTS

| | | | | |
|---|---|---|---|---|
| 3,773,967 | A * | 11/1973 | Sturm | H02G 7/14 174/127 |
| 4,474,133 | A * | 10/1984 | Anderson | H02G 7/00 116/209 |
| 4,839,567 | A * | 6/1989 | Milton | F21S 8/00 313/54 |
| 4,885,835 | A * | 12/1989 | Osgood | H02G 7/00 116/209 |
| 5,001,402 | A * | 3/1991 | Milton | F21S 8/00 313/54 |
| 5,208,577 | A * | 5/1993 | Herzberg | H02G 7/00 116/DIG. 33 |
| 5,224,440 | A * | 7/1993 | Cox | H02G 7/00 116/209 |
| 5,361,018 | A | 11/1994 | Milton | |
| 5,425,328 | A * | 6/1995 | Larumbe | H02G 7/00 116/209 |
| 5,537,111 | A * | 7/1996 | Martin | B64F 1/18 315/364 |
| 5,964,180 | A * | 10/1999 | De Gabriele | A01K 3/00 116/209 |
| 6,526,905 | B2 * | 3/2003 | Hawk | H02G 7/00 116/202 |
| 7,770,533 | B2 * | 8/2010 | Ramirez | A01M 29/06 116/209 |
| 8,869,732 | B1 * | 10/2014 | Chervick | A01M 29/08 116/22 A |
| 9,331,465 | B2 * | 5/2016 | Ortiz | H02G 7/00 |
| 2013/0014692 | A1 * | 1/2013 | Lee | A01M 29/10 116/22 A |

FOREIGN PATENT DOCUMENTS

| | | |
|---|---|---|
| GB | 2232474 A | 12/1990 |
| NL | 7808016 A | 2/1979 |

OTHER PUBLICATIONS

International Search Report and Written Opinion issued by the European Patent Office, dated Apr. 23, 2013, for International Application No. PCT/EP2013/053473; 7 pages.

\* cited by examiner

SIGNALLING DEVICE FOR A TRANSMISSION LINE

BACKGROUND

The invention relates to the signalling of a high-voltage aerial line or more generally an aerial transmission line by a signalling device in the context of air safety. The invention may be used in the field of the prevention of accidents during the day and/or at night of birds owing to impacts with transmission lines.

Without being limited to these materials or these values, standard transmission cables of high-voltage aerial lines most often comprise an aluminium alloy and most often have diameters of from 15 to 32 mm, sometimes up to 44 mm. Those cables are relayed over long distances by pylons which are generally spaced apart by approximately one hundred meters from each other. The voltages used vary according to the countries and needs, for example, between 63 and 90 kV for urban distribution or regional distribution and between 110 and 220 kV for regional exchanges. Values approaching 400 kV and more may be reached in some connections with very high voltage. Modern so-called "ultra-high-voltage" lines have been tested up to at least 1200 kV.

Unlike the low-voltage lines which are relatively close to the ground, at a height of approximately ten meters, high-voltage lines are installed at several tens of meters from the ground, often at a height between 30 and 50 meters from the ground as, for example, in France, but may be positioned at greater heights in accordance with their geographical location and their voltage level, reaching up to approximately 350 m for the tallest pylons. Therefore, those lines are at heights which may interfere not only with low trajectories of aircraft or gliders but also, for example, with the flight of migrating birds or the very rapid descending or ascending movements carried out by hunting raptors. Very-high-voltage lines of 225 or 400 kV and more have problems connected with health impacts, impacts on the landscape, tourism, habitat but also particularly ecological problems connected with collisions and electrocution of large numbers of birds which are regularly seriously injured, or killed, each year if they do not avoid those obstacles. In some regions with a high density of migratory birds, the number of victims may be as high as several thousands of victims/km/year, most often large birds.

This problem is known to electricity transport companies and various associations, in particular associations for the protection of birds. The most effective solution would be to bury the electrical lines but this solution has the disadvantage not only of being difficult but also of having to modify a very large proportion of the existing national and international electrical networks, and may therefore possibly be envisaged only over the very long term. Therefore, different types of signalling systems have been developed and are known in the prior art for signalling the high-voltage lines to aircraft and/or to birds. Each known system addresses similar obstacles but without succeeding in simultaneously overcoming them.

For example, document U.S. Pat. No. 4,885,835 discloses a spherical signalling device which comprises two hollow hemispheres of plastics material which surround a section of an aerial line in the context of signalling intended for aircraft pilots. The hemispheres are screwed together on the ground over approximately half of their perimeter, then the non-screwed portion is moved apart by an operator so as to place the hemispheres around a section of high-voltage line. The hemispheres of plastics material are subsequently screwed over the remainder of their perimeter. The disclosed device further comprises an attachment system using cabling which is intended to be wound around the high-voltage line. This type of system is not particularly well suited to very-high-voltage lines of 400 kV or more, whose cables can become heated to temperatures of up to from 80 to 250° C. That system is also not suitable for visibility at night, winter conditions or foggy conditions.

Other solutions are known in the prior art for signalling aircraft but are still at the experimental stage such as, for example, red-coloured counterweights which are bolted to the cables, or systems of wires twisted around the high-voltage cable. Even if some systems operate on cables of 400 kV and more, the visibility for birds remains ineffective, some systems are far too heavy to be deployed over the whole of a line, or they need tools which are too heavy and impractical for their assembly from a helicopter. The materials used further have problems of ageing, in particular involving the changing of colour, so that those devices are not identifiable by birds, in particular under conditions of fog, snow and/or darkness, and deteriorate over time.

Some solutions are known specifically for signalling intended for birds such as, for example, a helical system in which the devices of helical form and variable diameter are wound around the transmission line. Those helical systems weigh approximately 700 g each and are composed of plastics material, typically a thermoplastic polymer such as PVC, and are red and white in colour. In the prior art, such a helical system comprises two helixes which have a wider diameter than the others and which are visible to birds. The projected surface-area per unit is approximately 16800 $mm^2$ for a total exposed surface of 0.12 $m^2$ when 7 helical devices are arranged on cables between two successive pylons which are spaced apart by approximately 120 m, each device being spaced apart from the following or preceding device by approximately 15 m. This system is currently one of the most deployed on medium-voltage lines (up to 90 kV). Another system which is known from the prior art and which is used, for example, in Sweden, involves suspending a device resembling a bi-coloured card. In both cases, use on high-voltage lines cannot be envisaged owing to the temperatures reached, but in particular owing to the need for insulation products to be set to potential. This is because an insulation material positioned on a high-voltage line generates potentials known as "floating" potentials which result in the production of partial electrical discharges, generally referred to as the "corona effect", between the insulation components and the air. Those discharges destroy the insulation members, to the extent that they may be totally burnt, without taking into account the drops in voltage following that phenomenon, which may therefore go so far as to bring about a reduction in the voltage at the end of production and therefore potentially a reduction in the transit capacity. Extended use for signalling lines to birds also cannot be envisaged owing to the deterioration, in particular the loss of colour, owing to exposure to UV radiation. Those systems further have disadvantages involving durability owing to embrittlement of the materials used. The systems known in the prior art also have the disadvantage of not being suitable for use at night or during atmospheric influences and are particularly unsuitable for fog, snowy or icy conditions.

Therefore, there is a need to provide a signalling device which can be readily installed on a high-voltage aerial line. Given the dimensions, in particular the height, of the pylons supporting the lines and therefore the lines themselves, the installation of the signalling devices is generally carried out by an operator who is suspended from a helicopter, and each operation for installing a signalling device is therefore difficult and involves risks for the operator.

The signalling devices known from the prior art are distributed over the cables of high-voltage lines between each pylon so as to be visible to birds and/or aircraft pilots. Given the length of each cable, therefore, it is necessary to use a plurality of devices per cable in order to allow the identification of the entire length of a cable between two successive pylons. The weight of the signalling devices is therefore also important in order not to increase the mechanical stresses in the cables and therefore there is also a need to provide signalling devices which are quite light in order to be able to be installed in large numbers along a cable between two successive pylons of an aerial transmission line.

As mentioned above, it is also necessary to provide a device capable of operating equally well on low-voltage, medium-voltage, high-voltage or very-high-voltage lines, or even ultra-high-voltage lines.

In the context of preventing accidents involving birds but also of air safety in regions around airports, it is also necessary to provide a signalling device which is effective both during the day and at night, and for all meteorological conditions, in particular during hazy weather and under conditions of snow and/or frost.

SUMMARY

Therefore, an object of the present invention is to provide a signalling system for aerial transmission lines which is suitable particularly but not exclusively for high-voltage lines of at least 400 kV or more, whilst taking into account the problems mentioned above.

This object is achieved with a signalling device for an aerial transmission line comprising two signalling elements which are configured to be mounted one against the other around a conductor portion of the transmission line, in which at least one of the two signalling elements comprises at least partially an outer signalling coating in the context of air safety, and which device is characterised in that the two signalling elements are at least partially electrically conductive and at least one of the two signalling elements comprises a clamping means which is configured to clamp the conductor portion of the transmission line.

The signalling device according to the invention comprising materials which are at least partially electrically conductive may therefore be suitable for contact with conducting cables which transport high voltages and which may become heated up to high temperatures, including temperatures in the order of 250° C. or more. For example, the two signalling elements may be constructed from plastics materials with a metal coating, or completely from aluminium or any other semi-conductor, metal, conductive material or light alloy. A device according to the invention may therefore be mounted on lines at 400 kV or more, given that the conductivity of the materials used may be adapted in accordance with the voltage of the line. Materials which are at least partially conductive further allow a Faraday cage to be formed around the portion of conductive cable of the transmission line, which prevents the problems connected with the corona effect. A clamping means which clamps a conductive cable of the line, that is to say, takes the cable of the transmission line in a sandwich-like manner between the two signalling elements, allows retention and assembly which is simplified and advantageous with respect to the assemblies known from the prior art, and can therefore be adapted to fixing operations which are carried out via helicopter. The term "outer signalling coating visible to pilots and/or birds" is intended to be understood to mean that the device according to the invention comprises an outer coating which is visible to all types of birds and/or pilots, for example, pilots of aircraft, gliders, helicopters, or more broadly pilots of motorised or non-motorised flying devices. An outer coating may be selected so as to be visible to birds and/or pilots, for example, using one or more bright colours and with a strong contrast in relation to the ground. The colour orange or any colour included in a range from red to orange is, for example, identifiable by pilots and birds and contrasts with the majority of ground types, which advantageously allows the lines to be marked, in particular with regard to the dives carried out by hunting raptors if the colour orange is at least partially on the upper portion of the signalling device in relation to the ground.

Preferably, the two signalling elements may be substantially hemispherical. The generally spherical shape allows a reduction in the adhesion of snow in relation to the shapes used in the prior art for signalling devices intended for birds.

The hemispheres may advantageously be hollow which allows, on the one hand, the weight of the device to be reduced when it comprises a metal material and, on the other hand, the production of an internal space which is suitable for the arrangement of the clamping means.

Advantageously, each of the signalling elements may comprise at least two diametrically opposed holes which are configured to surround the conductor portion of the transmission line and to ensure the flow of air in the signalling device. That configuration is advantageous in the case of use on high-voltage or very-high-voltage lines, in which the temperature of the cables reaches 80° C., or from 200 to 250° C., respectively. The conductor portion clamped in the signalling device releases the heat inside the device, in particular in the case of very high-voltage or ultra-high-voltage lines. A ventilation system comprising diametrically opposed holes surrounding the cable allows air to flow along the entire portion of the cable contained inside the device.

Preferably, one of the signalling elements may further comprise two bars, in particular two substantially parallel bars, so that the clamping means is arranged on at least one of the two bars. In the case of a hollow device, an internal structure of at least one of the signalling elements allows an increase in the resistance of the device, for example, with respect to bending or deformations owing to the vibrations caused inter alia by the wind. An internal structure which comprises two parallel bars which connect substantially diametrically opposed locations, in particular which connect the ends of ventilation holes where present, allows the device generally to be reinforced. For example, in the case of a substantially spherical device, the bars may strengthen the device axially.

Preferably, the clamping means may comprise a lower clamping element which is fixed to the two bars so as to partially surround the conductor portion of the transmission line and which comprises a lower clamping flange and an upper clamping element which comprises an upper clamping flange which is fixed to one of the two bars and which can be closed by engagement with the other bar so as to surround the conductor portion of the transmission line between the lower and upper clamping elements. In the case of a substantially hollow device which comprises substantially parallel bars which strengthen the overall structure, therefore, a clamping means may advantageously be installed inside the device so as to clamp a portion of the voltage line. A device which allows engagement with one of the parallel bars is advantageous in that it allows simple and rapid positioning, in particular by an operator being suspended from a helicopter. An additional advantage may be that the parallel bars are partially flexible, in particular rigid in the direction of the axis thereof, but radially deformable which makes closure by engagement easier.

The upper clamping element may advantageously further comprise a clamping block which is configured to clamp the conductor portion of the voltage line with the lower clamping flange. A clamping means may be improved by the presence of, for example, blocks which allow the cable to be clamped, that is to say, allow it to be received in a sandwich-like manner, in particular by means of a screw which presses a clamping block against the cable held on a support surface and/or another clamping block, in particular inside a substantially hollow device.

Advantageously, the two signalling elements may be configured to be mounted one against the other by means of clip-fitting. A simple means for closing the device is a clip-fitting of the two signalling elements, which avoids the use of instruments during assembly.

Preferably, the outer signalling coating may comprise at least two colours. A signalling device may therefore comprise a colour on one portion of the device and at least one other colour on another portion of the device. For example, it is advantageous to use a coating which is visible during the day on a portion of the device, combined with a coating which is visible at night. It is also possible to combine, for example, a colour which strongly contrasts with the ground on the portion of the device directed towards the sky and a colour which contrasts strongly with the sky on the portion of the device which is directed towards the ground. In that manner, a bird which is diving towards the ground or which is ascending rapidly from the ground will be warned of the presence of an obstacle in both cases, respectively.

Advantageously, the signalling coating may be at least partially photoluminescent. The photoluminescence does not require any individual source of energy and is activated by ambient light. The photoluminescent effect is immediate, durable and does not involve any risk of breakdown. At least a portion of the device may therefore comprise a photoluminescent coating in order to be identifiable at night. In particular, the entire signalling device may be covered with a photoluminescent signalling coating or a photoluminescent layer, which affords an advantage in regions near zones around airports for signalling to aircraft during night-time operations or operations in low light.

Advantageously, the signalling coating may comprise at least partially an ice-repellent layer. Various ice-repellent treatments exist on the market and may be used to prevent the formation of ice and/or piles of snow on a signalling device. High-performance nanotechnologies are being developed in the fields of defence and aerospace. Other options involve using coatings which are latex-based, silicone-based or based on polytetrafluoroethylene or PTFE. For example, the PTFE-based treatments have ice-repellent characteristics and satisfactory mechanical, optical and electrical properties for use in the context of signalling for high-voltage lines. In particular, a PTFE-based processing operation does not change the appearance of the surface to which it is applied and may reduce the adhesion of ice to the application surface by up to 80%. This type of treatment is also known for not being subject to ageing which is accelerated during irradiation by UV radiation or during exposure to corrosive acid solutions. The ice-repellent coatings also have hydrophobic properties which allows an application surface to be kept clean during rainy weather, given that the water does not adhere but instead cleans the device in respect of dust which could be deposited there. The visibility of a device which is provided with an ice-repellent and hydrophobic layer may therefore be ensured in a durable manner. A device whose surface is provided at least partially, in particular completely, with such a coating is therefore suitable for prolonged use outdoors.

Preferably, the diameter of the signalling device may be in the order of from 200 to 500 mm, in particular in the order of 250 mm. Advantageously, the mass of the signalling device may be in the range from 300 g to 1 kg, preferably the mass may be less than 700 g, in particular in the order of 500 g or less. In particular, in the case of a sphere formed by two hollow hemispheres and an alloy comprising at least aluminium, a hollow sphere having a diameter of approximately 250 mm may be limited to a weight of approximately 500 g or less.

This object is also achieved with the method for assembling a signalling device for at least one aerial transmission line, comprising the steps of: providing at least one signalling device as described above; arranging the lower clamping element below a conductor portion of an aerial transmission line; closing the upper clamping element above the conductor portion of the transmission line, clamping the conductor portion of the transmission line between the lower clamping flange and the upper clamping flange; and clip-fitting the two signalling elements together.

The advantages set out above in respect of the device according to the invention and all the possible variants and embodiments may be combined in order to obtain more embodiments of the invention. In particular, the different advantageous embodiments according to the invention may be combined and used in the assembly method according to the invention.

BRIEF DESCRIPTION OF THE DRAWINGS

The invention will now be described in greater detail below with reference to illustrative examples of advantageous embodiments which are described with reference to the following Figures, in which.

Elements which are identical or which have similar functions in the different illustrative examples of embodiments of the invention will be indicated below with the same reference numerals or symbols.

DETAILED DESCRIPTION

Figure 1:
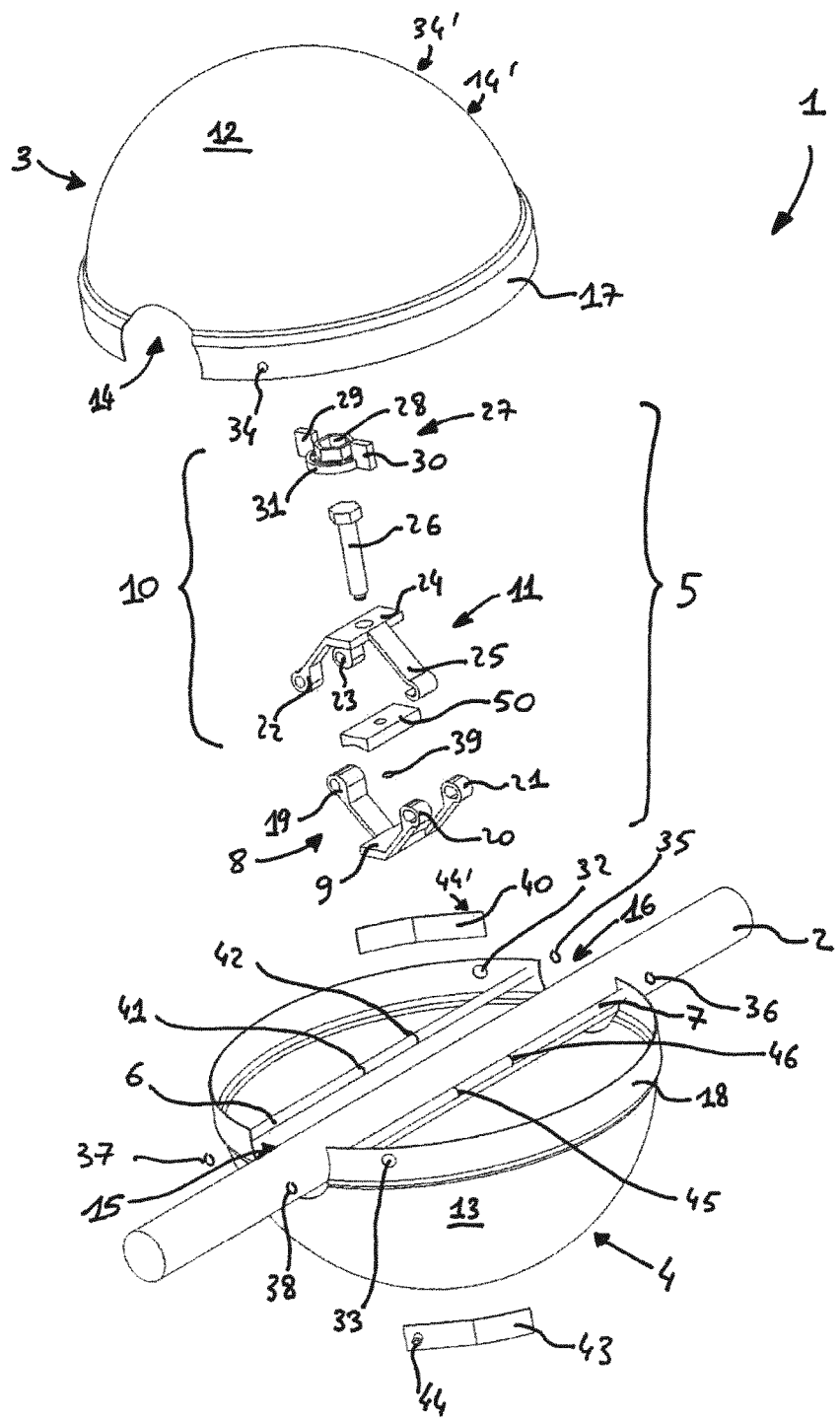
FIG. 1 is an exploded, three-dimensional schematic view of a signalling device for a transmission line according to an illustrative example of an embodiment of the invention.

FIG. 1 is an exploded, three-dimensional schematic view of an example of a signalling device 1 for a transmission line according to an illustrative embodiment of the invention. FIGS. 2A to 2G illustrate different steps of the assembly of such a device 1 on a conductive cable 2 of a transmission line, for example, a high-voltage aerial line.

According to one embodiment of the invention, the signalling device 1 illustrated in FIG. 1 comprises two signalling elements 3, 4 which are configured to be mounted one against the other so as to clamp the conductive cable 2 of a transmission line, for example, a high-voltage aerial line. In the illustrative example of FIG. 1, the two signalling elements 3, 4 may be composed of a plastics material which is integrally covered with a metal or a metal alloy. Preferably, in the example of FIG. 1, the two signalling elements 3, 4 are composed of aluminium or a metal or light metal alloy and are hollow hemispheres having a geometry which is substantially mutually identical. However, the signalling elements 3, 4 may have a different geometry from each other, in particular not necessarily a spherical geometry. In the case of hemispheres 3, 4 which comprise aluminium, it is possible to obtain a relatively light signalling device 1 which weighs approximately 500 g or less, which makes it quite light for being applied to high-voltage lines.

Figure 2A:
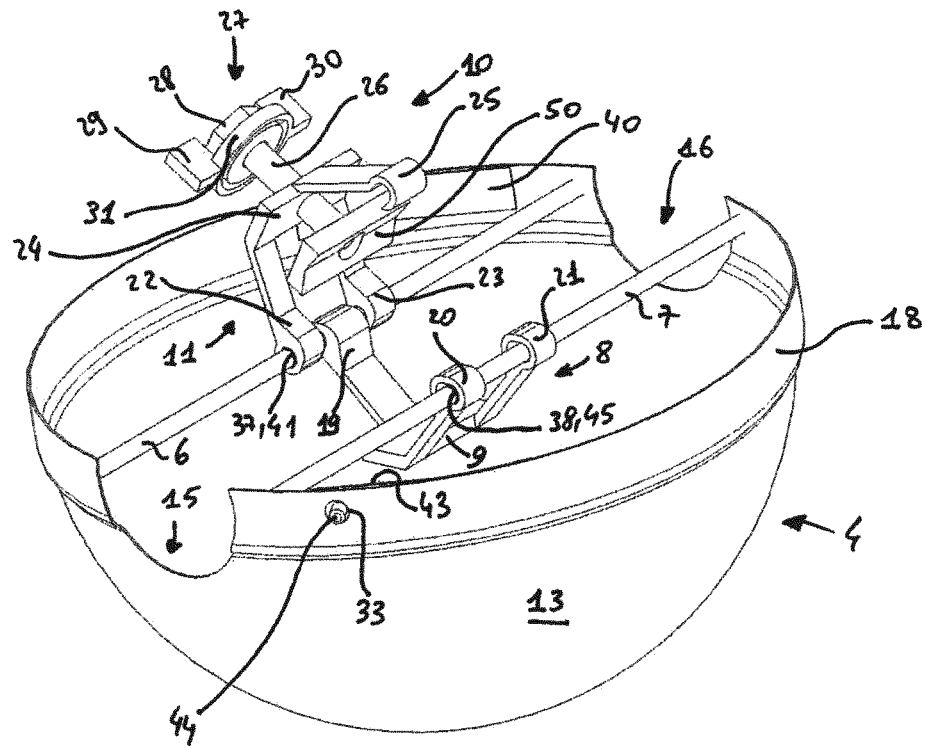
FIGS. 2A-2G show assembly steps of the illustrative device of FIG. 1 on a transmission line.

The perimeter of each hemisphere 3, 4 comprises an annular element 17, 18, of which the annular element of the upper hemisphere 3 relative to the cable 2 protrudes slightly more in relation to the surface 12 of the upper hemisphere 3 than the annular element 18 does from the surface 13 of the lower hemisphere 4 so as to be mounted on the annular element 18 of the lower hemisphere 4. The two signalling elements 3, 4 also each comprise two holes 14, 14', 15, 16 of substantially semicircular form which are diametrically opposed and configured so as to receive the cable 2 in the direction of the length thereof. The second hole 14' of the upper hemisphere 3 is not visible in FIG. 1 but is diametrically opposed to the hole 14 in a similar manner to the holes 15, 16 of the lower hemisphere 4. When the signalling element 3 is mounted on the signalling element 4, the holes 14, 14', 15, 16 form circles around the cable 2, leaving a space for ventilating the interior of the device 1. That system is particularly suitable in the case of high-voltage or very-high-voltage lines, whose heat brought about by the transport of the electric current may reach at least 80° C., or from 200 to 250° C., and even higher temperatures, respectively. The holes 14, 14', 15, 16 therefore form a transverse ventilation passage along the device 1, as illustrated in FIG. 2A, in the longitudinal direction of the cable 2, as illustrated in FIGS. 1 and 2B to 2G, which allows simple and effective ventilation of the interior of the device 1.

Figure 2B:
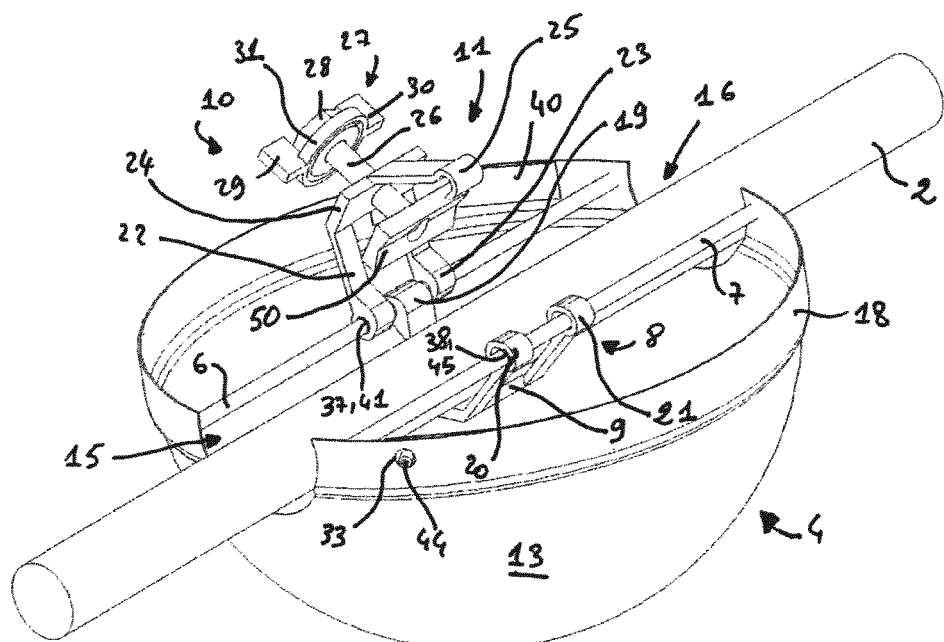
Figure 2C:
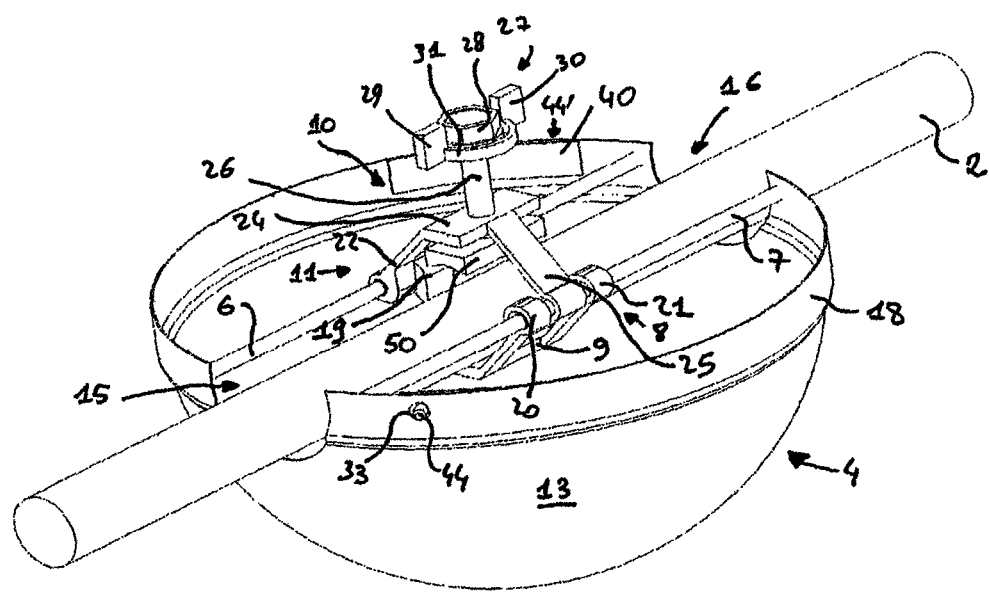
Figure 2D:
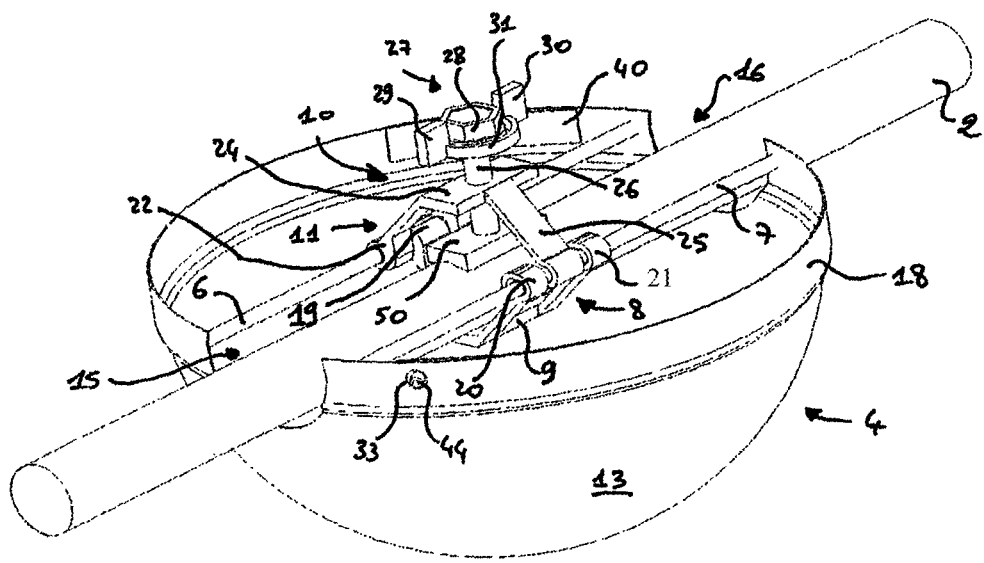
Figure 2E:
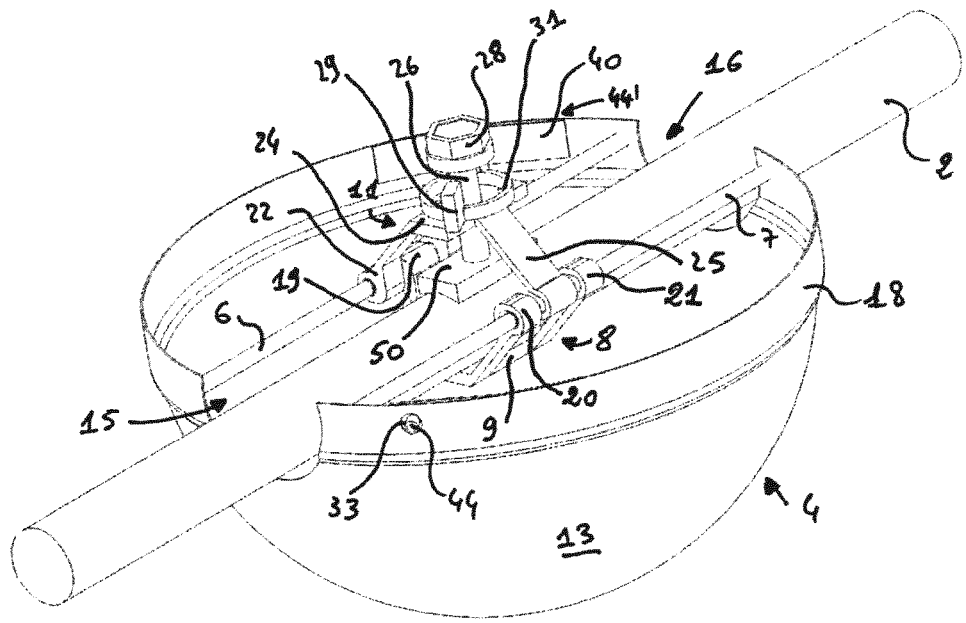
Figure 2G:
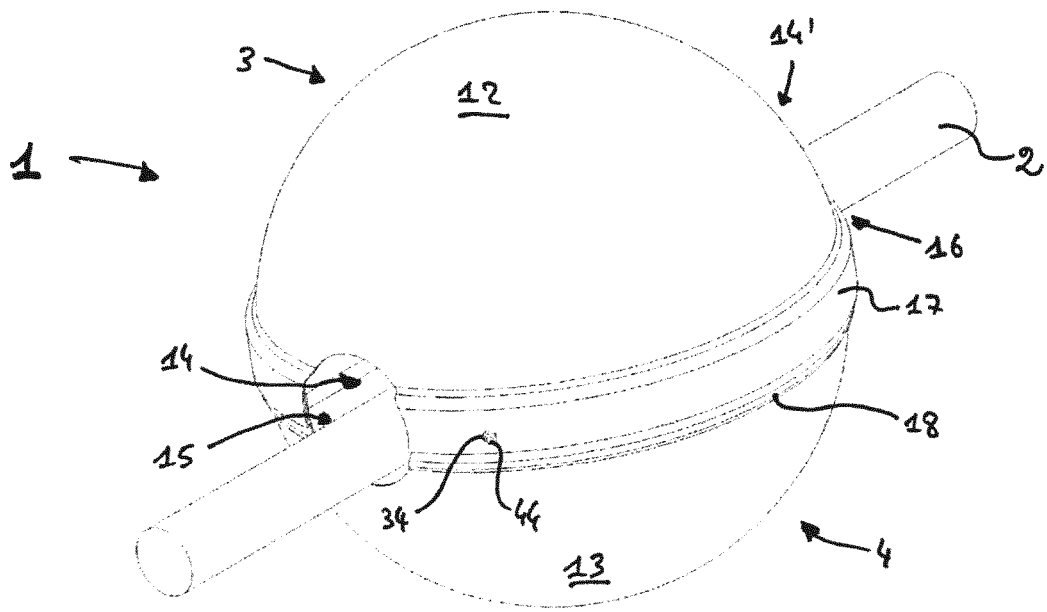

The signalling elements 3, 4 also each comprise two diametrically opposed holes 32, 33, 34, 34'. The second hole 34' of the signalling element 3 cannot be seen in FIG. 1 but is diametrically opposed to the hole 34 in a similar manner to the holes 32, 33 of the other signalling element 4. Those holes 32, 33, 34, 34' are in the annular elements 17, 18 of each hemisphere 3, 4 and have a diameter less than the width of the annular elements 17, 18, respectively. The lower signalling element 4 further comprises two identical flexible plates 40, 43 which each comprise a clip-fit projection 44, 44'; the projection 44' of the plate 40 cannot be seen in FIG. 1. The plates 40, 43 are fixed to the interior of the annular element 18 so as to allow the clip-fit projections 44, 44' to pass through the holes 32, 33. In that manner, the upper signalling element 3 is clip-fitted to the clip-fit projections 44, 44' by means of the holes 34, 34' of the annular element 17 thereof in the final position as illustrated in FIG. 2G.

According to an embodiment of the invention, at least one of the two signalling elements 3, 4, in this instance the lower hemisphere 4, comprises two parallel bars 6, 7 which are partially flexible and which allow the aluminium chassis of the lower signalling element 4 to be strengthened. In that manner, if the device 1 illustrated in FIG. 1 comprises aluminium, the torsions and deformations caused by heavy exposure to the wind may be avoided or at least lessened in relation to a hollow element which does not comprise those support bars.

According to an embodiment of the invention, at least one of the two signalling elements 3, 4, in this instance the lower element 4, comprises a clamping means 5 which is intended to clamp the cable 2 in order to maintain the device 1 mounted on a transmission line, in particular a high-vciltage line. The different elements which constitute the clamping means 5 may be of metal or composed of a metal alloy which may be adapted in accordance with the type of line and the heat released. The clamping means 5 comprises a lower clamping element 8 which comprises a lower clamping flange 9, on which the cable 2 rests during installation as shown in the illustration of FIG. 2B, and which is fixed, on the one hand, to the first parallel bar 6 by a lug 19 and, on the other hand, to the second parallel bar 7 by means of two lugs 20, 21 having an oblong hole. The lugs 20, 21 having an oblong hole are substantially fixed in position in the longitudinal direction of the bar 7 by recesses 45, 46, in which stop rings 36, 38 are placed.

The geometry of the assembly of the clamping means 5 is such that it is arranged substantially around the centre of the sphere formed by the two signalling elements 3, 4, as illustrated in FIGS. 2A to 2G.

The clamping means 5 also comprises an upper clamping element 10 which itself comprises an abutment plate 24 which is retained on the parallel bar 6 by means of two lugs 22, 23, whose movement is limited, as for the lugs 20, 21, in the longitudinal direction of the bar 6 by recesses 41, 42 in the bar 6, in which stop rings 35, 37 are placed. The abutment plate 24 of the upper clamping element 10 also comprises a hooked lug 25 which is intended to engage with the parallel bar 7 in order to surround, in particular clamp, the cable 2 in the clamping means 5, as illustrated in FIGS. 2A to 2C. In particular, FIG. 2A illustrates the lower signalling element 4 with the clamping means 5 being mounted on the parallel bars 6, 7 in the open position. FIG. 2B illustrates the same state, with a cable 2 pressing on the lower clamping flange 9. Finally, FIG. 2C illustrates the closure of the hooked lug 25 on the bar 7, thereby surrounding the cable in abutment against the lower clamping flange 9, and between the lugs 19, 20, 21, 22, 23, 25, and the abutment plate 24. The oblong hole of the head of the lugs 20, 21 having an oblong hole allows the partial radial flexibility of the parallel bar 7 to be used during the engagement of the bar 7 by the hooked lug 25 as illustrated in FIG. 2C. The hooked lug 25 thereby repels the bar 7, which can be bent in the radial direction and can therefore slide in the holes of the lugs 20, 21 having an oblong hole, which makes it easier to carry out the engagement operation, in particular for an operator being suspended from a helicopter.

The dimensions and the geometry of the holes 14, 14', 15, 16, the arrangement of the parallel bars 6, 7 and the dimensions of the clamping means 5 can all be adapted to the dimensions, in particular the diameter, of the cable 2 of the voltage line on which the signalling device 1 must be mounted.

According to a variant of an embodiment of the invention, the upper clamping element 10 may comprise an upper clamping flange 11 which is configured to clamp the cable 2 with the lower clamping flange 9. This is the case for the exemplary device 1 illustrated in FIGS. 1 and 2A to 2G. In the illustrative example of FIGS. 1 and 2A to 2G, the upper clamping flange 11 is retained on the upper clamping element 10 by means of a screw 26 having a hexagonal head and a stop ring 39. In order to make the installation operations easier, in particular for an operator being suspended from a helicopter, the clamping torque of the clamping block 50 of the upper clamping flange 11 is controlled by a meltable head 27 on the hexagonal screw 26, whose head is received in a hexagonal core 28 of the meltable head 27. The meltable head 27 also comprises a meltable ring 31, on which two fins 29, 30 are arranged. The complete assembly of the clamping means 5, in particular the upper clamping element 10 comprising the clamping block 11 and the hexagonal screw 26 having a meltable head 27, can be seen in FIG. 2A before a cable 2 is arranged in the device 1 which is illustrated in FIG. 2B.

FIG. 2A shows how the lower clamping element 8 and upper clamping element 10 are arranged on the parallel bars 6, 7. The upper clamping element 10 is arranged in a rotatable manner about the bar 6 so that the hooked lug 25 can close the clamping means 5 by engaging with the bar 7, as in FIG. 2C, once the lower signalling element 4 has been arranged below the cable 2, as in FIG. 2B. The cable 2 is clamped by the clamping element 5 and, in principle, an installation operator could mount the signalling element 3 in order to finalise the assembly of the signalling device 1 on a transmission line.

Therefore, an operator does not need any tools to install a signalling device 1 according to the invention on a cable 2 of a voltage line, which is advantageous in the case of high-voltage lines installed several tens of meters above the ground. After carrying out the steps described above with reference to FIGS. 2A to 2C, the installation operator can subsequently turn the meltable head 27 by means of the fins 29, 30 in order to press the clamping block 11 against the cable 2, thereby clamping the cable 2 between the clamping block 11 and the lower clamping flange 9, as illustrated in FIG. 2D. The meltable head 27 allows the operator to control the torque applied during the clamping action. When the clamping block 11 is in a position against the cable 2 and the operator continues to turn the meltable head 27 of the screw 26 having a hexagonal head, the meltable ring 31 and the fins 29, 30 become detached from the hexagonal ring 28 of the meltable head 27 and fall on the abutment surface 24 of the upper clamping element 10, as illustrated in FIG. 2E. This has the advantage that, for an installation operator suspended from a helicopter, there is no moving part which can fall or become detached from the lower signalling element 4 during or after the installation. Therefore, the meltable ring 31 remains secured between the screw 26 having a hexagonal head, the hexagonal ring 28 of the meltable head 27 and the abutment surface 24.

Figure 2F:
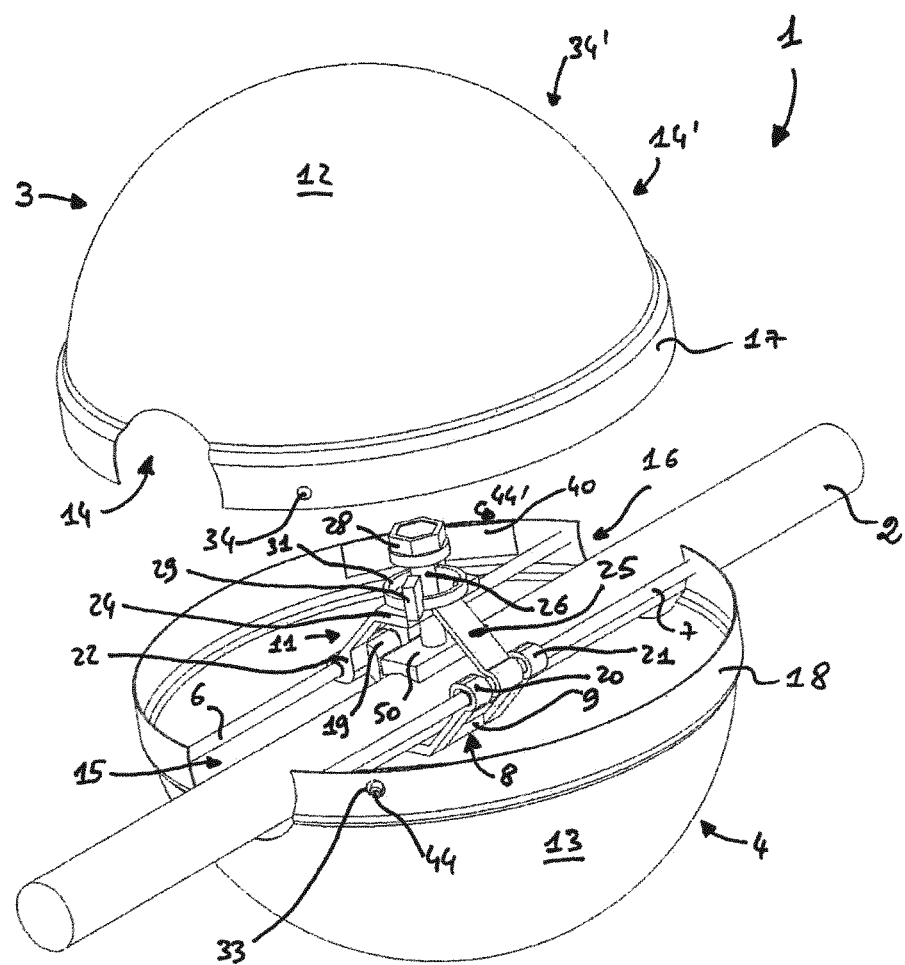

The final step of the assembly subsequently involves clip-fitting the upper signalling element 3 to the lower signalling element 4 by means of the clip-fit projections 44, 44' of the flexible plates 40, 43 in the region of the holes 32, 33, 34, 34'. This is illustrated in FIG. 2F for the provision of the upper hemisphere 3 and, in FIG. 2G, for the closure of the signalling device 1 thereby forming substantially a sphere which clamps the cable 2 of a transmission line.

According to one embodiment of the invention, at least a portion of the outer surfaces 12, 13 of the signalling elements 3, 4 comprises a signalling covering which can be identified by birds. In that manner, in the illustrative example of FIGS. 1 and 2A to 2G, at least the entire outer surface 12 of the upper hemisphere 3 is red, orangey-red, orange in colour, or of any other colour in the range of bright colours between red and orange, which has the advantage of contrasting with the ground sufficiently to allow identification for birds, in particular hunting raptors during their extremely fast diving movements, or for identification from a glider or an aircraft. This colour also has the advantage of being visible during hazy weather or during fog. It will be understood that any other portion of the signalling device 1 could be of this colour or another colour, provided that the constraint of contrast with the ground and the visibility in fog or during hazy weather is complied with.

According to a variant of an embodiment of the invention, the device 1 may comprise at least two colours. In an illustrative example, if the upper hemisphere 3 of the device 1 is orange, the lower hemisphere 4 could be green or yellow. A device 1 which is in at least two colours also allows identification in the event of winds which are blowing at high speeds and bringing about movements of the transmission lines.

According to another variant, the coating of the device 1 could be partially photoluminescent. In that manner, in an illustrative example of an embodiment of the invention, the lower hemisphere 4 is green or yellow and photoluminescent, which, combined with the orange upper hemisphere 3, allows visibility at any time, including at night, without using an additional energy source.

The spherical shape of the device 1 of the illustrative example of FIGS. 1 and 2A to 2G prevents the accumulation of snow on the outer surfaces 12, 13. According to a variant of an embodiment of the invention, this may be complemented by an ice-repellent coating in order to prevent as effectively as possible any deposit of snow and/or ice which would reduce the visibility of the device 1 to birds. Various ice-repellent treatments exist on the market and can be used to prevent the formation of ice and/or piles of snow on a signalling device, high-performance nanotechnologies, latex-based coatings, silicone-based coatings or coatings based on polytetrafluoroethylene or PTFE. In the illustrative example of FIG. 1 and FIGS. 2A to 2G, the device 1 could have been processed with a PTFE coating which, in addition to the ice-repellent characteristics, also has the advantage of conserving the appearance of the surface to which it is applied and may reduce the adhesion of ice to the application surface by up to 80%. One advantage is that the weight of the device 1 can be limited in an icy environment, which prevents an excessive weight from being placed on the cable 2 of the transmission line. Such a coating allows the quality of the signalling colours to be conserved, for example, the orange colour of the upper hemisphere 3, and the photoluminescent yellow or green colour of the lower signalling element 4. Ice-repellent coatings also have hydrophobic properties which allows the surface 12, 13 of the device 1 to be kept clean during wet weather, given that water does not adhere thereto. The visibility of the device 1 can therefore be ensured in a durable manner because the device 1 is thereby protected from changes in colour and deposits of dust which could make it less visible to pilots or birds.

Figure 3:
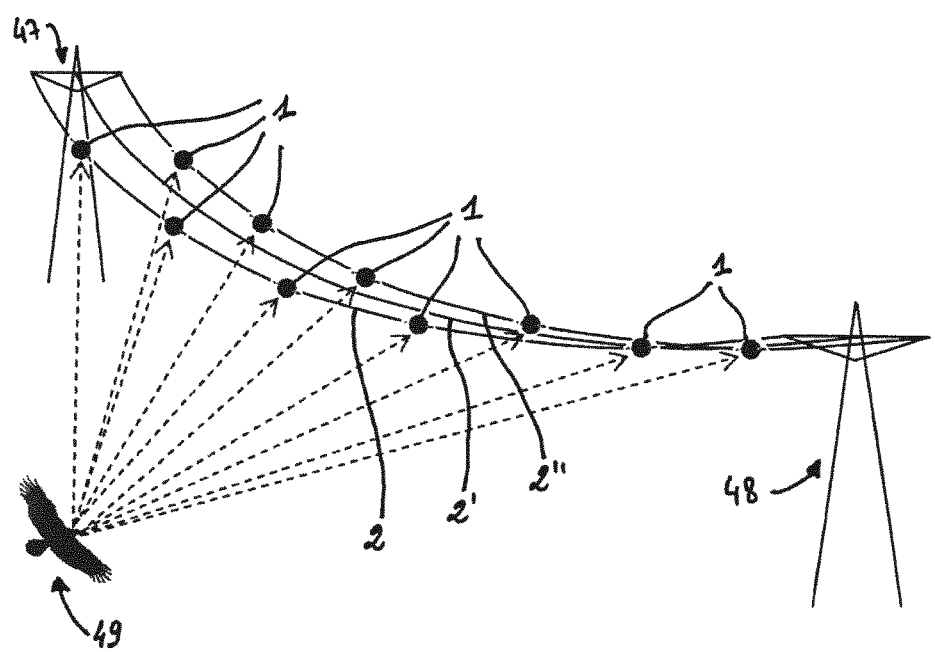
FIG. 3 is an illustrative example of one possible configuration of a plurality of signalling devices according to the invention on aerial transmission lines.

FIG. 3 is a diagram illustrating in a simplified manner an application of the assembly of a signalling device 1 as described in the illustrative examples of an embodiment of the invention with reference to FIGS. 1 and 2A to 2G on cables 2, 2', 2" between two successive pylons 47, 48 of a high-voltage line. The configuration described with reference to FIG. 3 is therefore purely illustrative and must not therefore be interpreted as being the only possible configuration or the only possible application of an embodiment of the invention. The signalling devices 1 used for the illustrative example of FIG. 3 have the advantages described above with reference to the illustrative examples of embodiments described with reference to FIGS. 1 and 2A to 2G.

In the illustrative example of FIG. 3, the two pylons 47, 48 are spaced apart by approximately 120 m but this distance may vary in reality, for example, in accordance with the geography of the location where the transmission lines are installed. FIG. 3 further illustrates that the two pylons 47, 48 support three conductive cables 2, 2', 2" of an aerial transmission line but the invention may be applied to transmission lines whose pylons support more or fewer cables than the configuration illustrated in FIG. 3.

In the example of FIG. 3, the two outermost conductive cables 2, 2" supported by the pylons 47, 48 are each provided with five signalling devices 1 according to the invention. Projecting from the point of view of the bird 49 which is approaching, the ten devices 1 are spaced apart from each other by approximately 11 m. In other configurations, a single cable 2 or all the cables 2, 2', 2" could be provided with signalling devices 1. In still other configurations, each cable 2, 2', 2" could receive more than five devices 1, for example, ten devices 1 spaced apart by 11 m over the entire length of the same cable 2, 2', 2" between the two pylons 47, 48. All the numerical configurations of the devices 1 on one or more cables 2, 2', 2" are permitted provided that the total weight supported does not weaken the structure of the aerial transmission line, in particular does not apply excessive tension to the cables.

In the example of FIG. 3, the device 1 is therefore of substantially spherical shape with a diameter of approximately 250 mm and is composed of two hollow aluminium hemispheres 3, 4. The total weight of a signalling device 1 is thus maintained at approximately 500 g, which allows at least approximately ten of them to be installed between two pylons 47, 48, with spacings of only 11 m between each device 1 if the two pylons are spaced apart by approximately 120 m. In the case illustrated in FIG. 3, the projected surface-area per unit is approximately 49090 mm$^2$ for a total exposed surface-area of 0.49 m$^2$ if ten devices 1 are mounted on the conductive cables 2, 2', 2". Those values are not restrictive and depend on the geometry of the signalling device 1 and the configuration selected for the assembly of the devices 1 on the cables 2, 2', 2". In the case of pylons 47, 48 which are spaced apart by approximately 120 m, the use of devices 1 according to the invention allows more devices 1 to be mounted and thereby an increase by a factor of 4 in the total exposed surface-area which is therefore visible to birds in relation to the devices known in the prior art, such as the helical system for a total combined weight which is less.

Therefore, the signalling device 1 of a transmission line, in particular a high-voltage or very-high-voltage aerial line, according to the invention, and the different possible variants and embodiments thereof has at least the same advantages as some devices known in the prior art, that is to say, ease of installation and speed of installation, and dispenses with the use of tools, which therefore allows the devices to be used in the case of assembly carried out by an operator being suspended from a helicopter. The invention and its various variants further have a number of advantages and/or improvements in relation to the prior art: geometry preventing deposits of snow and/or ice, in particular in the case of a spherical shape, optionally complemented by an ice-repellent coating; more effective signalling owing to a total visible projected surface-area which is increased over the prior art, in particular in terms of the spherical geometry which allows effective signalling in all angular directions; effective signalling during the day including in foggy weather by means of visible colours which contrast with the relief of the landscape, in particular the colour orange, in particular for the upper signalling element; night-time signalling which is independent of a source of energy in the case of photoluminescent materials or coatings, in particular the use of the photoluminescent colour green and/or yellow for the lower signalling element; improvement in the visibility at high wind speeds in the case of a signalling element which has at least two colours; weight limited to approximately 500 g including in the case of an element which uses conductive materials such as aluminium, allowing the installation of a plurality of signalling devices on a line between two successive pylons for a limited total weight and therefore a controlled and limited tension of the cables; possible use whatever the type of transmission line, whether low-voltage, medium-voltage, high-voltage, very-high-voltage or ultra-high-voltage owing to the conductive properties of the device, and therefore the possibility of installation on lines whose temperatures may reach 250° C. or more; service-life and visibility which are increased over the prior art, in particular in the case of use of an ice-repellent coating; system clamping the cable inside the signalling device, preventing slippage of the device on the cable; control of the clamping torque, in particular when using a clamping element comprising a meltable screw head.

It should be noted that the various embodiments and features of the different illustrative examples of embodiments of the invention may all be combined in order to construct additional advantageous embodiments of the present invention.

LIST OF REFERENCE NUMERALS

| | |
|---|---|
| 1 | Line signalling device |
| 2 | Transmission line cable |
| 3 | Upper hemisphere/signalling element |
| 4 | Lower hemisphere/signalling element |
| 5 | Clamping means |
| 6 | First parallel bar |
| 7 | Second parallel bar |
| 8 | Lower clamping element |
| 9 | Lower clamping flange |
| 10 | Upper clamping element |
| 11 | Upper clamping flange |
| 12 | Outer surface of 3 |
| 13 | Outer surface of 4 |
| 14 | First hole of 3 |
| 14' | Second hole of 3 |
| 15 | First hole of 4 |
| 16 | Second hole of 4 |
| 17 | Edge of hemisphere 3 |
| 18 | Edge of hemisphere 4 |
| 19 | Lug of 8 |
| 20 | First lug having oblong hole of 8 |
| 21 | Second lug having oblong hole of 8 |
| 22 | First lug of 10 |
| 23 | Second lug of 10 |
| 24 | Abutment surface of screw 26 |
| 25 | Hook of 10 |
| 26 | Screw having hexagonal head |
| 27 | Meltable head for hexagonal screw |
| 28 | Hexagonal ring |
| 29 | First fin |
| 30 | Second fin |
| 31 | Meltable ring |
| 32 | Hole for clip-fit projection |
| 33 | Hole for clip-fit projection |
| 34 | First clip-fit hole |
| 34' | Second clip-fit hole |
| 35 | Stop ring |
| 36 | Stop ring |
| 37 | Stop ring |
| 38 | Stop ring |
| 39 | Stop ring |
| 40 | First flexible clip-fit plate |
| 41 | Recess for stop ring |
| 42 | Recess for stop ring |
| 43 | Second flexible clip-fit plate |
| 44 | Clip-fit projection |

-continued

| | |
|---|---|
| 44' | Clip-fit projection |
| 45 | Recess for stop ring |
| 46 | Recess for stop ring |
| 47 | Pylon |
| 48 | Pylon |
| 49 | Flying bird |
| 50 | Clamping block |

The invention claimed is:

1. A signalling device for an aerial transmission line comprising two signalling elements which are configured to be mounted one against the other around a conductor portion of the transmission line, in which at least one of the two signalling elements comprises at least partially an outer signalling coating which is visible to pilots and/or birds, wherein the two signalling elements are at least partially electrically conductive and at least one of the two signalling elements comprises a clamping mechanism which is configured to clamp the conductor portion of the transmission line, wherein one of the signalling elements further comprises:
two substantially parallel bars positioned internally of the one signalling element, so that the clamping means is arranged on at least one of the two bars,
the clamping mechanism comprising:
a lower clamping element which is fixed to the two bars so as to partially surround the conductor portion of the transmission line and which comprises a lower clamping flange, and;
an upper clamping element which comprises an upper clamping flange which is fixed to one of the two bars and which can be closed by engagement with the other bar so as to surround the conductor portion of the transmission line between the lower clamping element and upper clamping element.

2. A signalling device according to claim 1, wherein the two signalling elements are substantially hollow hemispheres.

3. A signalling device according to claim 1, wherein each of the signalling elements comprises at least two diametrically opposed holes which are configured to surround the conductor portion of the transmission line and to ensure the flow of air in the signalling device.

4. A signalling device according to claim 1, wherein the upper clamping element further comprises a clamping block which is configured to clamp the conductor portion of the voltage line with the lower clamping flange.

5. A signalling device according to claim 1, wherein the two signalling elements are configured to be mounted one against the other by means of clip-fitting.

6. A signalling device according to claim 1, wherein the outer signalling coating comprises at least two colors.

7. A signalling device according to claim 1, wherein the signalling coating is at least partially photo-luminescent.

8. A signalling device according to claim 1, wherein the signalling coating comprises at least partially an ice-repellent layer.

9. A method for assembling a signalling device for at least one aerial transmission line, comprising the steps of:
providing at least one signalling device according to claim 1,
arranging the lower clamping element below a conductor portion of an aerial transmission line,
closing the upper clamping element above the conductor portion of the transmission line,
clamping the conductor portion of the transmission line between the lower clamping flange and the upper clamping flange, and
clip-fitting the two signalling elements together.

10. A signalling device for an aerial transmission line, comprising:
two signalling elements which are configured to be mounted one against the other around a conductor portion of the transmission line, in which at least one of the two signalling elements comprises at least partially an outer signalling coating which is visible to pilots and/or birds, wherein the two signalling elements are at least partially electrically conductive;
a clamping mechanism coupled internally to one of the two signalling elements and configured to clamp to the conductor portion of the transmission line, the clamping mechanism comprising a lower clamping element for positioning beneath the transmission line and an upper clamping mechanism coupled to the lower clamping element, and an actuator to move the clamping elements relatively towards and away from each other to retain the transmission line therebetween;
wherein the two signalling elements may be coupled to each other enclosing the clamping mechanism.

11. A signalling device according to claim 10, wherein the two signalling elements are substantially hollow hemispheres.

12. A signalling device according to claim 10, wherein each of the signalling elements comprises at least two diametrically opposed holes which are configured to surround the conductor portion of the transmission line and to ensure the flow of air in the signalling device.

13. A signalling device according to claim 10, wherein:
one of the signalling elements further comprises two bars positioned internally of the one signalling element, so that the clamping means is arranged on at least one of the two bars,
the lower clamping element is fixed to the two bars so as to partially surround the conductor portion of the transmission line and which comprises a lower clamping flange, and;
the upper clamping element comprises an upper clamping flange which is fixed to one of the two bars and which can be closed by engagement with the other bar so as to surround the conductor portion of the transmission line between the lower clamping element and upper clamping element.

14. A signalling device according to claim 13, wherein the two bars are substantially parallel.

15. A signalling device according to claim 13, wherein the upper clamping element further comprises a clamping block which is configured to clamp the conductor portion of the voltage line with the lower clamping flange.

16. A signalling device according to claim 10, wherein the two signalling elements are configured to be mounted one against the other by means of clip-fitting.

17. A signalling device according to claim 10, wherein the outer signalling coating comprises at least two colors.

18. A signalling device according to claim 10, wherein the signalling coating is at least partially photo-luminescent.

19. A signalling device according to claim 10, wherein the signalling coating comprises at least partially an ice-repellent layer.

20. A method for assembling a signalling device for at least one aerial transmission line, comprising the steps of:
providing at least one signalling device according to claim 10, arranging the lower clamping element below a conductor portion of an aerial transmission line, closing the upper clamping element above the conductor portion of the transmission line, clamping the conductor portion of the transmission line between the lower clamping flange and the upper clamping flange, and clip-fitting the two signalling elements together.

\* \* \* \* \*